United States Patent [19]
Johnson

[11] 3,867,906
[45] Feb. 25, 1975

[54] DOG SHOWER
[75] Inventor: Phyllis Johnson, St. Albans, N.Y.
[73] Assignee: Lawrence Peska Associates, Inc., New York, N.Y.
[22] Filed: Dec. 17, 1973
[21] Appl. No.: 425,248

[52] U.S. Cl. ............................................. 119/158
[51] Int. Cl. ........................................ A01k 29/00
[58] Field of Search ............................... 119/1, 158

[56] References Cited
UNITED STATES PATENTS
2,661,865  12/1953  Wendt ............................. 119/158 X
2,984,240  5/1961  Eames ............................. 119/33 X
3,749,064  7/1973  Weinstein et al. ................ 119/158
3,793,987  2/1974  Rogers ............................. 119/1

FOREIGN PATENTS OR APPLICATIONS
479,256  11/1969  Switzerland

Primary Examiner—Hugh R. Chamblee
Attorney, Agent, or Firm—Henry I. Steckler

[57] ABSTRACT

A dog shower has a spherical chamber with a door that has a window. A nozzle is near the top of the chamber and sprays water and soap onto the dog. The dog stands on a drain floor below which is a drain hose having a filter.

9 Claims, 4 Drawing Figures

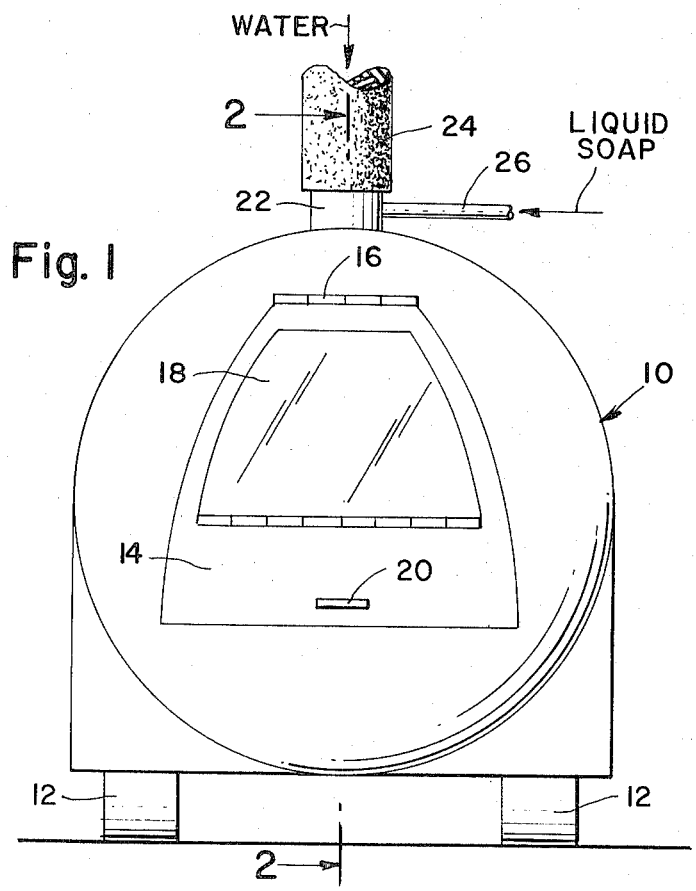
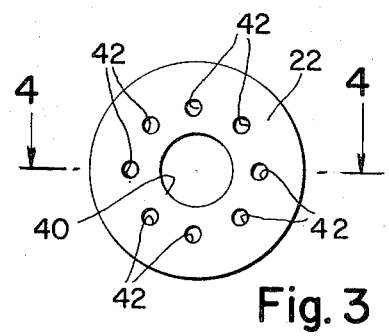
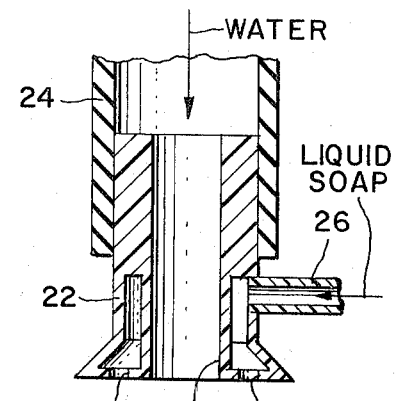
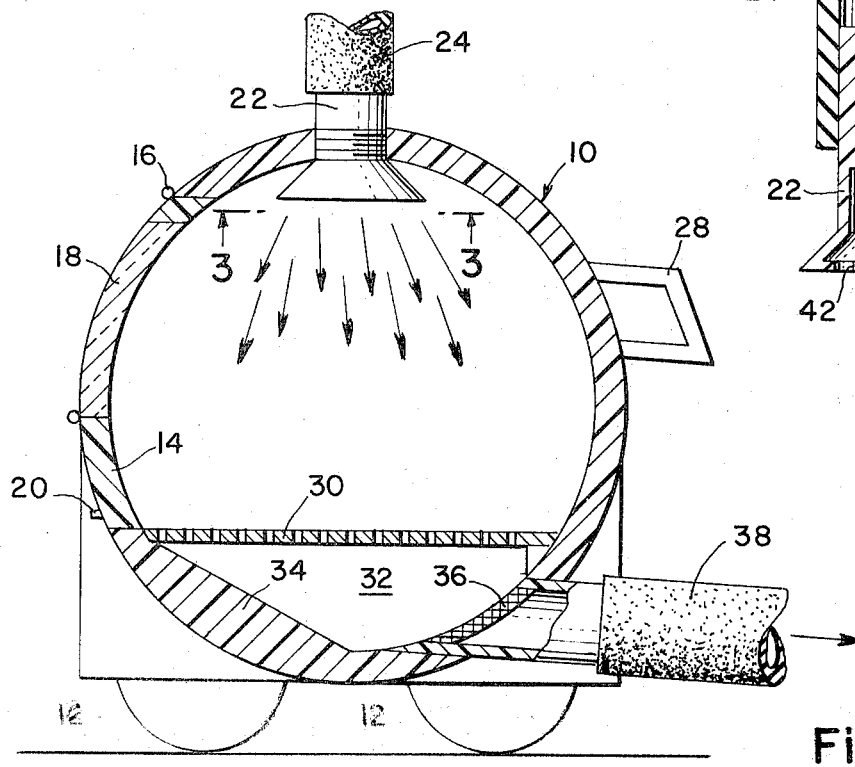

DOG SHOWER

The present invention relates to a shower, and more particularly, to one for animals such as a dog.

A problem with manually washing an animal such as a dog is that one must first apply water and then soap, which is time consuming. In addition, the animal frequently moves or shakes himself in order to remove the water and become dry, thereby causing the washer and nearby objects to become wet. Also, the dirt, loose hair, etc. that come off the animal during the process can clog sink drain pipes or otherwise be a removal problem.

It is therefore an object of the present invention to mix soap with water for application to the animal.

It is another object of the invention to enclose the animal while it is being showered.

It is yet another object to provide for the disposal of whatever undesirable things come from the animal's coat as a result of being showered.

In brief, these and other objects are achieved by having an enclosure for the animal to prevent its splashing the environment. A nozzle is located at the top of the enclosure and it provides both water and soap at the same time. A drain floor is near the bottom and supports the animal while allowing dirt, hair, etc., to fall to the bottom. A filter traps the dirt, etc., while allowing the water to drain away without clogging the drain system.

These and other objects, features and advantages will become apparent from the following description when taken in conjunction with the drawings in which:

FIG. 1 is a front view of the invention;

FIG. 2 is a cross-sectional view taken along line 2—2 of FIG. 1;

FIG. 3 is a bottom view of a nozzle; and

FIG. 4 is a cross-section along line 4—4 of FIG. 3.

In FIG. 1 there is shown a spherical enclosure 10 mounted on wheels 12 and having a door 14 mounted on hinge 16. The animal to be washed is inserted through door 14. A window 18 is on door 14 as is handle 20. At the top of enclosure 10 is nozzle 22 with water tube 24 and liquid soap tube 26 attached thereto.

The cross-sectional view of FIG. 2 shows handle 28 which is mounted on enclosure 10 and with wheels 12 makes the entire unit easily moveable. A removable drain floor 30 holds the animal to be washed above it, while the soap and water spray from nozzle 22 cleans the animal or any other object in enclosure 10. Since floor 30 is foraminous, it allows the soap and water as well as dirt, hair and anything else washed from the animal to drain into lower compartment 32. Here a sloping internal side 34 directs the liquid and solid matter towards filter 36, and hence to drain hose 38. Filter 36 traps the solid matter waste in compartment 32 while allowing the liquid soap and water to be conducted away by hose 38. After the washing operation the animal is removed through door 14 and then so is floor 30 thereby permitting a manual cleaning out of compartment 32.

FIG. 3 shows that the bottom of nozzle 22 has a central hole 40 for water and a plurality of planitary holes 42 for emitting soap. FIG. 4 discloses that hose 24, which is connected to a water faucet, communicates with hole 40, while hose 26, which is connected to a liquid soap supply, communicates with holes 42. Separate valves are provided (not shown) so that each can be separately controlled. Initially both soap or some other detergent and water are provided to both wet and soap up the animal in one step. Thereafter, just water is provided to remove the soap from the animal.

It will be appreciated that many other embodiments are possible without departing from the spirit and scope of the invention.

Having herein described the invention, what is claimed as new is:

1. A device comprising an enclosure means for enclosing an object to be washed, a nozzle means disposed at the top of said enclosure for spraying said object with water, a foraminous drain floor means disposed proximate the bottom of said enclosure for supporting said object and for permitting liquid and any particles removed from said object during washing to drop to the bottom of said enclosure, said nozzle having a large central hole for purveying water independent of a detergent and a plurality of smaller holes disposed about said central hole for purveying liquid detergent independently of the purveying of said water.

2. A device as claimed in claim 1 wherein said enclosure comprises a door having a window.

3. A device as claimed in claim 1 wherein said nozzle has means for receiving and spraying liquid detergent.

4. A device as claimed in claim 1 further comprising a plurality of wheels mounted at the bottom of said enclosure, whereby said device can be easily moved.

5. A device as claimed in claim 1 further comprising filter means disposed in said enclosure beneath said floor for keeping said removed particles in said enclosure and permitting the water to exit therefrom.

6. A device as claimed in claim 1 further comprising a handle attached to said enclosure.

7. A device as claimed in claim 1 wherein said enclosure is spherically shaped.

8. A device as claimed in claim 1 wherein said floor is removable.

9. A device as claimed in claim 1 wherein said enclosure has a sloping bottom and side portion.

* * * * *